Dec. 27, 1932.  W. D. RISHER  1,891,949
INTERLOCK FOR ELECTRICAL CIRCUITS
Filed Oct. 23, 1929  3 Sheets-Sheet 1

Inventor
William Dean Risher
By William Isler
Attorney

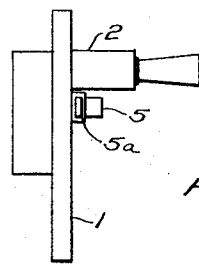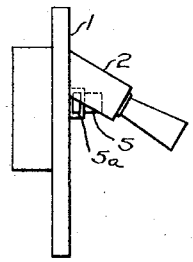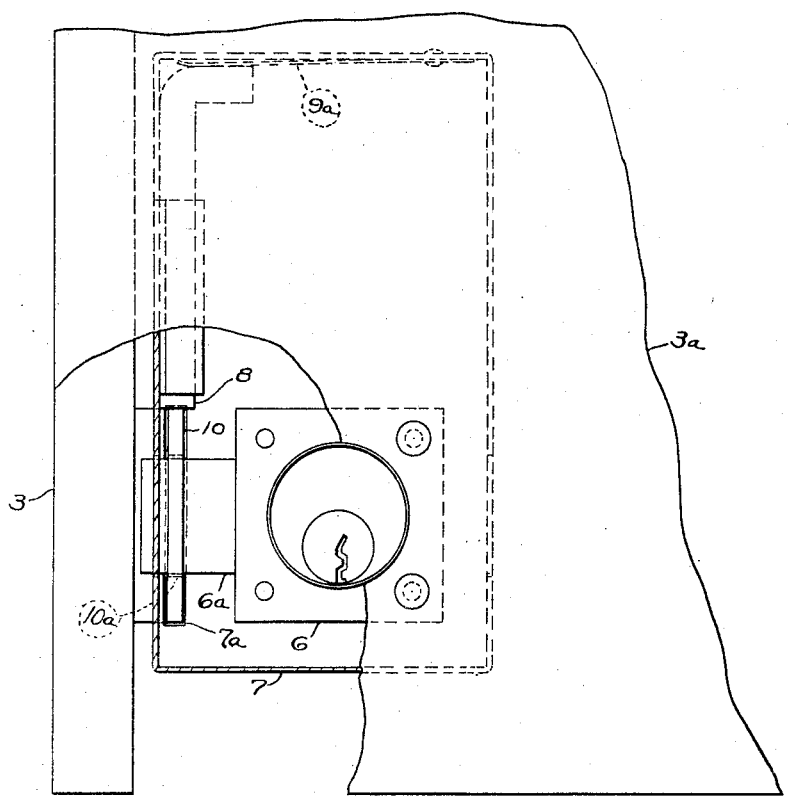

Dec. 27, 1932.  W. D. RISHER  1,891,949
INTERLOCK FOR ELECTRICAL CIRCUITS
Filed Oct. 23, 1929  3 Sheets-Sheet 3

Inventor
William Dean Risher
William Isler
Attorney

Patented Dec. 27, 1932

1,891,949

UNITED STATES PATENT OFFICE

WILLIAM DEAN RISHER, OF MASSILLON, OHIO, ASSIGNOR, BY MESNE ASSIGNMENTS, TO REPUBLIC STEEL CORPORATION, OF YOUNGSTOWN, OHIO, A CORPORATION OF NEW JERSEY

INTERLOCK FOR ELECTRICAL CIRCUITS

Application filed October 23, 1929. Serial No. 401,827.

This invention relates in general to safety devices for electrical equipment, and more particularly to interlocks for high tension circuits.

In the transmission of high potential electrical currents through metallic conductors, it is the practice to include in each conductor an oil switch, which serves as a primary non-arcing circuit breaker, and a plurality of disconnecting switches, which serve to sectionalize the load circuit into any desired number of branches.

Should any of the disconnecting switches be pulled while the circuits are under load, the arcing at the points of said switch may result in damage to the surrounding equipment or injury or death to the operator. For this reason, it is of utmost importance that the non-arcing oil switch be opened first in order to render the load circuits dead.

Occasionally, through inadvertence or carelessness, the operator will pull the disconnecting switches first, as a consequence of which he may be seriously injured or killed.

Even if he has opened the oil switch first, and then the desired disconnecting switches, there is no assurance that either he or another operator will not close the oil switch while work is being done on that portion of the circuit leading from the oil switch to the disconnecting switches.

For the purpose of eliminating these hazards, various devices have been employed, such as electrically operated interlocks. In one of these interlocks, a motor is employed to open and close the oil switch, the motor circuit being controlled by a key-manipulated switch, withdrawal of the key from the switch serving to de-energize the motor circuit. When the key is withdrawn from the switch, it may be used to unlock a cabinet containing the disconnecting switches. An apparent disadvantage of such a system lies in the fact that the circuit to the key-manipulated switch may become shorted, in which case withdrawal of the key will not serve to open the motor circuit.

It is the primary object of the present invention to provide a mechanically operated interlock for oil circuit breakers and disconnecting switches, whereby all of the aforesaid hazards and disadvantages will be eliminated and proper sequence operation thereof will be assured.

Another object of the invention is to provide a mechanically operated interlock for the purpose described which may be quickly installed on old or new equipment and which will be simple and reliable, as well as visible at all times in operation.

With the above and other objects in view, which will be more readily apparent as the nature of the invention is better understood, the same consists in the novel construction, combination and arrangement of parts hereinafter more fully described, illustrated and claimed.

A preferred and practical embodiment of the invention is shown in the accompanying drawings, wherein Fig. 1 is a plan view of a switch panel;

Fig. 4 is a side elevation of the oil switch locked in open position;

Fig. 5 is a view similar to Fig. 4 but showing the oil switch in closed position;

Fig. 6 is a full size fragmentary front elevation of the cabinet housing the disconnecting switches, and showing the position of the various parts when the cabinet door is closed and locked;

Figure 3:
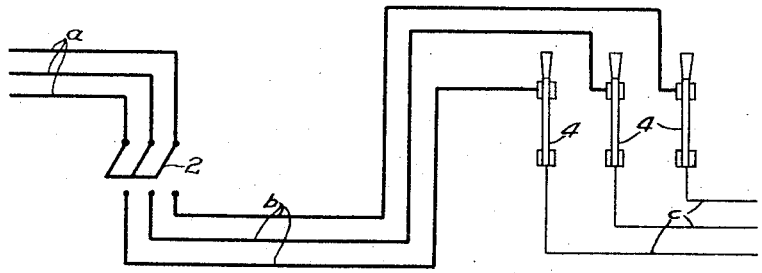
Fig. 3 is a wiring diagram of the switch panel.

Referring more particularly to the drawings, wherein like reference characters designate like parts throughout the several figures, 1 is a panel having mounted thereon an oil switch 2 and a cabinet 3 housing a plurality of disconnecting switches 4. As shown in Fig. 3, the oil switch 2 is adapted to make or break a three phase circuit including power lines a. The circuit further includes interswitch conductors b leading to load conductors c through the disconnecting switches 4.

Mounted on the front of the panel 1 adjacent the oil switch 2 is a cabinet lock 5 having a bolt 5a adapted to obstruct the downward movement of the oil switch handle when the lock is locked, and to permit such downward movement when the lock is unlocked.

Figure 9:
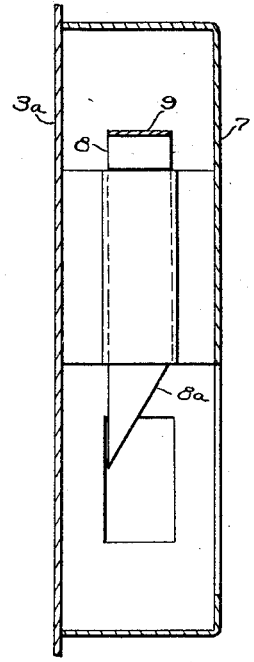
Fig. 9 is a cross-section, taken on the line 9—9 of Fig. 8.
Figure 8:
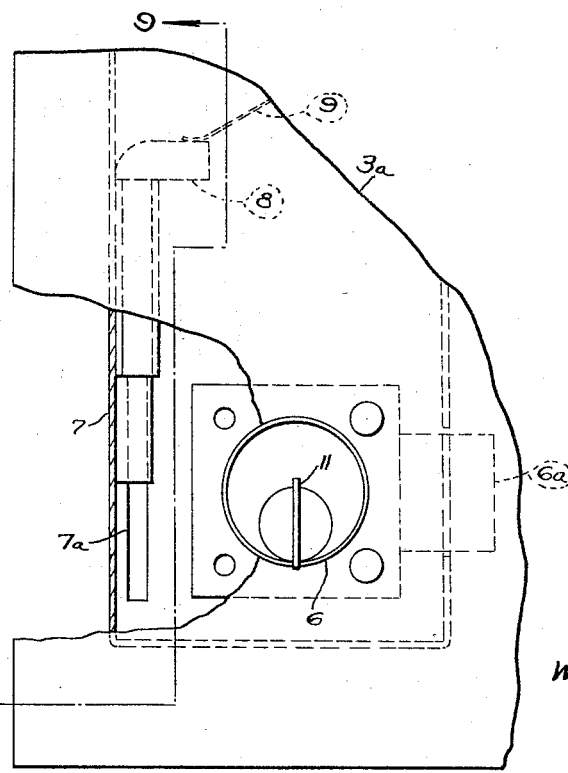
Fig. 8 is a full size fragmentary front elevation of the cabinet door, and showing the position of the various parts when the cabinet door is unlocked and open.

The cabinet 3 is open at the bottom and is provided with a door 3a hinged at its upper edge to the cabinet. Mounted on the door 3a is a cabinet lock 6 having a bolt 6a. The lock is enclosed in a box 7 which is secured to the inner face of the door 3a and is provided with a vertically slidable member 8, which is normally urged to its lowermost position, as shown in Figs. 8 and 9, by means of a flat spring 9. The lower end of the member 8 is beveled as at 8a.

Figure 1:
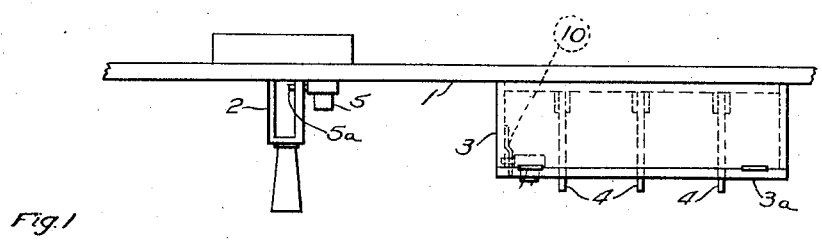
Figure 2:
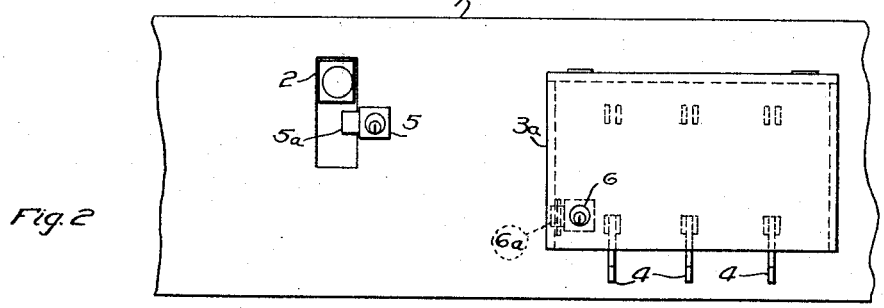
Fig. 2 is a front elevation of the switch panel shown in Fig. 1.
Figure 7:
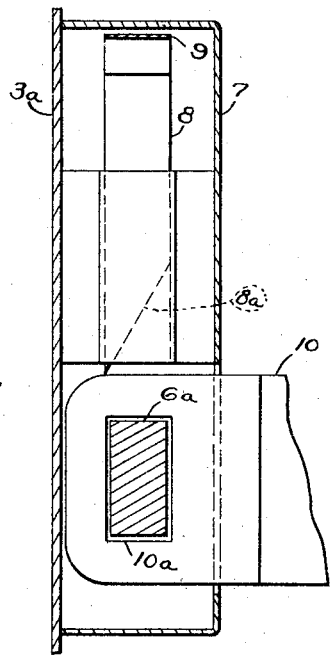
Fig. 7 is a fragmentary cross-section, taken on the line 7—7 of Fig. 6.

As shown in Figs. 1, 6 and 7, a keeper 10 having a rectangular opening 10a therein is secured to the side of the cabinet by any suitable means and in such position that it may enter a vertical slot 7a in the rear face of the box 7 when the door 3a is closed.

The cabinet locks 5 and 6 are identical in every respect and are adapted to be manipulated by means of a single key 11. These locks are of the well-known type characterized by the fact that the key cannot be removed from the lock when the lock is in unlocked condition.

If the oil switch 2 is closed, as indicated by the position of the handle in Fig. 5, and it is desired to manipulate one or more of the disconnecting switches 4, it is necessary to lock the lock 5. Since the oil switch handle, when in the position shown in Fig. 5, obstructs the movement of the lock bolt 5a, it is first necessary to raise the oil switch handle to the position shown in Fig. 4, whereupon the lock 5 may be locked and the key 11 withdrawn. In this position of the handle, the oil switch 2 is open, and the interswitch conductors b are dead.

By means of the key 11, the lock 6 may be then unlocked and the door 3a opened. The opening movement of the door withdraws the support of the keeper 10 from beneath the member 8, permitting the latter to drop to the position shown in Figs. 8 and 9, wherein it prevents locking of the lock 6. As previously stated, the key 11 cannot be withdrawn from the lock 6 as long as the lock is unlocked. With the door 3a thus opened, the operator may manipulate the disconnecting switches 4.

So long as the door 3a is open, the operator has visible assurance that the oil switch 2 is open, and he may proceed with safety to open or close any of the disconnecting switches.

Upon closing the door 3a, the keeper 10 strikes the beveled portion 8a of the member 8, lifts the latter out of the path of the bolt 6a to the position shown in Figs. 6 and 7, and permits the cabinet lock 6 to be locked, the bolt 6a of the lock entering the rectangular opening 10a in the keeper 10, thus securing the door 3a in closed position. The key 11 may then be withdrawn from the lock 6 and used to unlock the lock 5, permitting the oil switch 2 to be closed. The key cannot be removed from the lock 5 as long as the oil switch is closed.

Claims:—

1. In combination with an electrical circuit having a plurality of switches, means for insuring proper sequence of opening and closing of said switches, said means including separate locks for said switches operable by a single key, which is not removable from either lock except when such lock is locked, and a bolt for positively preventing the closing of one of said switches.

2. In combination with an electrical circuit having an oil switch and a disconnecting switch, means for insuring proper sequence of opening and closing of said switches, said means including separate locks for said switches operable by a single key, which is not removable from either lock except when such lock is locked, and a bolt for positively preventing the closing of one of said switches.

3. In combination with an electrical circuit having a plurality of switches, means for insuring proper sequence of opening and closing of said switches, said means including separate locks for said switches, each lock having a bolt which when thrown prevents closing its switch, said locks being operable by a single key, which is not removable from either lock except when the bolt thereof is thrown.

4. In combination with an electrical circuit having as oil switch and a disconnecting switch, means for insuring proper sequence of opening and closing of said switches, said means including separate locks for said switches, each lock having a bolt which when thrown prevents closing its switch, said locks being operable by a single key, which is not removable from either lock except when the bolt thereof is thrown.

In testimony whereof I affix my signature.

WILLIAM DEAN RISHER.